US012722955B2

(12) United States Patent
Messina et al.

(10) Patent No.: US 12,722,955 B2
(45) Date of Patent: Sep. 1, 2026

(54) BI-DIRECTIONAL CHARGING SYSTEM FOR A LIFT

(71) Applicant: Oshkosh Corporation, Oshkosh, WI (US)

(72) Inventors: Robert Messina, Oshkosh, WI (US); Shashank Bhatia, Oshkosh, WI (US); Ignacy Puszkiewicz, Hagerstown, MD (US); Mike Buhidar, Oshkosh, WI (US); David Lombardo, Oshkosh, WI (US); Peter Gilbert, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 706 days.

(21) Appl. No.: 18/158,245

(22) Filed: Jan. 23, 2023

(65) Prior Publication Data

US 2023/0234821 A1 Jul. 27, 2023

Related U.S. Application Data

(60) Provisional application No. 63/302,171, filed on Jan. 24, 2022.

(51) Int. Cl.

| | |
|---|---|
| ***H02J 7/00*** | (2026.01) |
| ***B60L 53/10*** | (2019.01) |
| ***B66F 7/28*** | (2006.01) |
| ***B66F 11/04*** | (2006.01) |

(52) U.S. Cl.

CPC ............... *B66F 11/04* (2013.01); *B60L 53/10* (2019.02); *B66F 7/28* (2013.01)

(58) Field of Classification Search

None

See application file for complete search history.

(56) References Cited

U.S. PATENT DOCUMENTS

| | | | | |
|---|---|---|---|---|
| 11,749,991 | B1 * | 9/2023 | Seroff .................. | H02J 7/0013 320/109 |
| 2012/0280649 | A1 * | 11/2012 | Jung ...................... | H02J 50/10 320/108 |
| 2015/0033962 | A1 | 2/2015 | Schwartz et al. | |
| 2015/0061590 | A1 | 3/2015 | Widmer et al. | |
| 2015/0159564 | A1 | 6/2015 | Wildgrube et al. | |
| 2015/0175353 | A1 | 6/2015 | Gillmore et al. | |
| 2017/0136888 | A1 | 5/2017 | Ricci | |
| 2017/0253221 | A1 | 9/2017 | Verhoff et al. | |
| 2017/0291802 | A1 | 10/2017 | Hao et al. | |

(Continued)

*Primary Examiner* — Arun C Williams

(74) *Attorney, Agent, or Firm* — Foley & Lardner LLP

(57) ABSTRACT

Systems and apparatuses include a platform charger for use with a lift, such as an aerial work platform (AWP) or mobile elevating work platform (MEWP). The platform charger includes an elevated platform, a ramp extending away from a first end of the platform, a battery, and an induction coil. The induction coil is received within the platform and positioned near an upper surface of the platform. The induction coil is configured to receive electricity from an energy source and generate a magnetic field that extends substantially upwardly, through the platform to objects positioned on the platform. The induction coil is also configured to act as an antenna, such that if the induction coil is positioned within an magnetic field, a current will be induced in the induction coil that can be used to recharge a battery associated with the platform charger.

11 Claims, 8 Drawing Sheets

(56) References Cited

U.S. PATENT DOCUMENTS

2017/0291805 A1 10/2017 Hao et al.
2017/0297425 A1 10/2017 Wildgrube et al.
2018/0162704 A1 6/2018 Hao et al.
2019/0071291 A1 3/2019 Puszkiewicz et al.
2019/0119088 A1 4/2019 Puszkiewicz et al.
2019/0121353 A1 4/2019 Datema et al.
2019/0185077 A1 6/2019 Smith et al.
2019/0185301 A1 6/2019 Hao et al.
2019/0322321 A1 10/2019 Schwartz et al.
2019/0322512 A1 10/2019 Puszkiewicz et al.
2019/0351883 A1 11/2019 Verhoff et al.
2019/0352157 A1 11/2019 Hao et al.
2020/0031641 A1 1/2020 Puszkiewicz et al.
2020/0094671 A1 3/2020 Wildgrube et al.
2020/0140248 A1 5/2020 Hackenberg et al.
2020/0316816 A1 10/2020 Messina et al.
2020/0317065 A1 10/2020 Lombardo
2020/0317083 A1 10/2020 Messina et al.
2020/0317480 A1 10/2020 Shankar et al.
2020/0317486 A1 10/2020 Puszkiewicz et al.
2020/0317488 A1 10/2020 Bafile et al.
2020/0317489 A1 10/2020 Bhatia et al.
2020/0317491 A1 10/2020 Bafile et al.
2020/0317492 A1 10/2020 Bhatia et al.
2020/0317493 A1 10/2020 Lombardo et al.
2020/0346547 A1 11/2020 Rocholl et al.
2021/0002112 A1 1/2021 Puszkiewicz et al.
2021/0031611 A1 2/2021 Yakes et al.
2021/0031612 A1 2/2021 Yakes et al.
2021/0031649 A1 2/2021 Messina et al.
2021/0039935 A1 2/2021 Hackenberg et al.
2021/0091436 A1 3/2021 Haring et al.
2021/0124347 A1 4/2021 Datema et al.
2021/0155463 A1 5/2021 Hao et al.
2021/0221216 A1 7/2021 Yakes et al.
2021/0229755 A1 7/2021 Schwartz et al.
2021/0252969 A1 8/2021 Wildgrube et al.
2021/0276423 A1 9/2021 Lombardo et al.
2021/0276848 A1 9/2021 Miller et al.
2021/0276850 A1 9/2021 Lombardo et al.
2021/0279991 A1 9/2021 Shankar et al.
2021/0323763 A1 10/2021 Koga et al.
2021/0323764 A1 10/2021 Koga et al.
2021/0323765 A1 10/2021 Koga et al.
2021/0325529 A1 10/2021 Koga et al.
2021/0325911 A1 10/2021 Koga et al.
2021/0327164 A1 10/2021 Koga et al.
2021/0345062 A1 11/2021 Koga et al.
2021/0362696 A1 11/2021 Verhoff et al.
2021/0362697 A1 11/2021 Verhoff et al.
2021/0370893 A1 12/2021 Verhoff et al.
2021/0370894 A1 12/2021 Verhoff et al.
2021/0373560 A1 12/2021 Koga et al.
2021/0380085 A1 12/2021 Verhoff et al.
2021/0380179 A1 12/2021 Smith et al.
2021/0395058 A1 12/2021 Hao et al.
2022/0009338 A1 1/2022 Yakes et al.
2022/0033181 A1 2/2022 Koga et al.
2022/0097527 A1 3/2022 Koga et al.
2022/0097961 A1 3/2022 Koga et al.
2022/0097964 A1 3/2022 Koga et al.
2022/0135385 A1 5/2022 Lombardo et al.
2022/0144226 A1 5/2022 Verhoff et al.
2022/0144227 A1 5/2022 Verhoff et al.
2022/0176921 A1 6/2022 Verhoff et al.
2022/0185582 A1 6/2022 Koga et al.
2022/0185643 A1 6/2022 Messina et al.
2022/0194333 A1 6/2022 Verhoff et al.
2022/0194334 A1 6/2022 Verhoff et al.
2022/0234554 A1 7/2022 Verhoff et al.
2022/0234555 A1 7/2022 Verhoff et al.
2022/0234873 A1 7/2022 Miller et al.
2022/0289152 A1 9/2022 Verhoff et al.
2022/0332556 A1 10/2022 Kobel et al.
2022/0348090 A1 11/2022 Lombardo
2022/0371864 A1 11/2022 Shankar et al.
2023/0002152 A1 1/2023 Koga et al.
2023/0049763 A1 2/2023 Messina et al.
2023/0089417 A1 3/2023 Koga et al.
2023/0092520 A1 3/2023 Verhoff et al.

* cited by examiner

BI-DIRECTIONAL CHARGING SYSTEM FOR A LIFT

CROSS-REFERENCE TO RELATED PATENT APPLICATION

This application claims the benefit of and priority to U.S. Provisional Application No. 63/302,171, filed on Jan. 24, 2022, the entire disclosure of which is hereby incorporated by reference in its entirety.

BACKGROUND

Aerial work platforms (AWPs) and mobile elevating work platforms (MEWPs) are increasingly transitioning to semi-electric or all electric configurations. To support the increasing electrification of these AWPs and MEWPs, the vehicles are equipped with one or more charge storing devices, such as batteries. Because the capacity of charge storing devices is limited, recharging is frequently needed.

SUMMARY

One exemplary embodiment relates to a platform charger for use with a lift, such as an aerial work platform (AWP) or mobile elevating work platform (MEWP). The platform charger includes an elevated platform, a ramp coupled to a first side of the platform and extending away from the platform structure, a battery, and an induction coil. The induction coil is received within the platform and is positioned near an upper surface of the platform. The induction coil is configured to receive electricity from an energy source (e.g., a utility source via outlet, a generator, a battery assembly) and generate an magnetic field that extends upwardly, through the platform to objects positioned on the platform. The induction coil is also configured to act as an antenna, such that if the induction coil is positioned within an magnetic field, a current will be induced in the induction coil that can be used to recharge a battery associated with the platform charger. Additionally, the lift devices configured for use with the platform charger can be configured to transmit energy from their collective batteries to other lift devices, in addition to the energy source or storage system of the platform charger.

Another embodiments relates to a lift, such as an aerial work platform (AWP) or mobile elevating work platform (MEWP). The lift includes a chassis, a battery pack coupled to the chassis, and a first antenna coil. The first antenna coil is electrically coupled to the battery pack and configured to generate current from a first magnetic field and transmit the current to the battery pack to charge the battery pack. The first antenna coil is also configured to generate a second magnetic field using current from the battery pack to transmit energy from the battery pack outwardly, away from the chassis.

Still another embodiment relates to a method of charging a lift, such as an aerial work platform (AWP) or mobile elevating work platform (MEWP). The method includes providing a first lift device comprising a first chassis, a first battery pack coupled to the first chassis, and a first antenna coil electrically coupled to the battery pack. The method further includes providing a second lift device comprising a second chassis, a second battery pack coupled to the second chassis, and a second antenna coil electrically coupled to the second battery pack. The method includes generating, by the first antenna coil, a first magnetic field using supplied current from the first battery pack to transmit energy from the first battery pack outwardly, away from the chassis and generating, by the second antenna coil, current from the first magnetic field. The method also includes transmitting, from the second antenna coil, the current to the second battery pack to charge the second battery pack.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
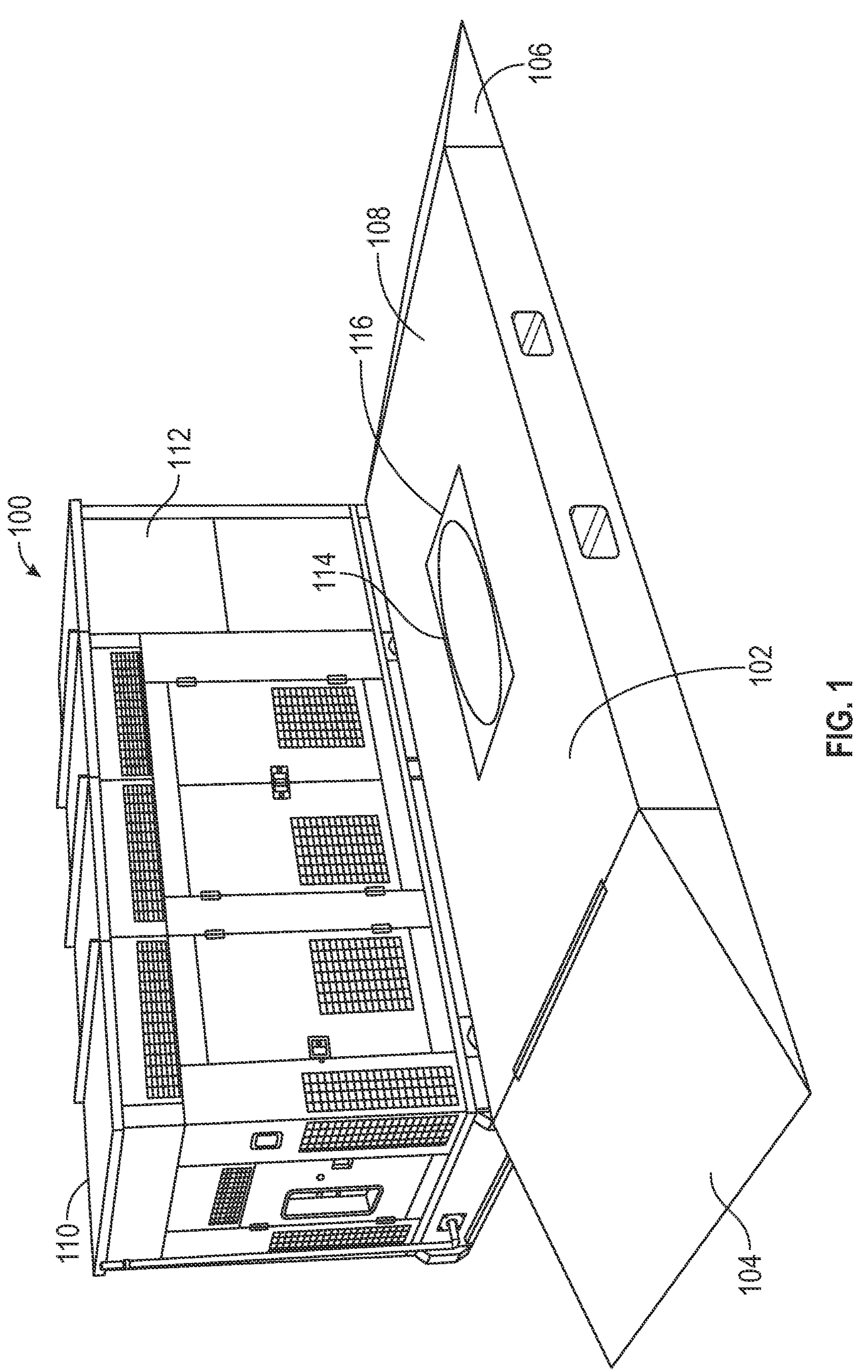
FIG. 1 is a perspective view of a platform charging unit, according to an exemplary embodiment.
Figure 2:
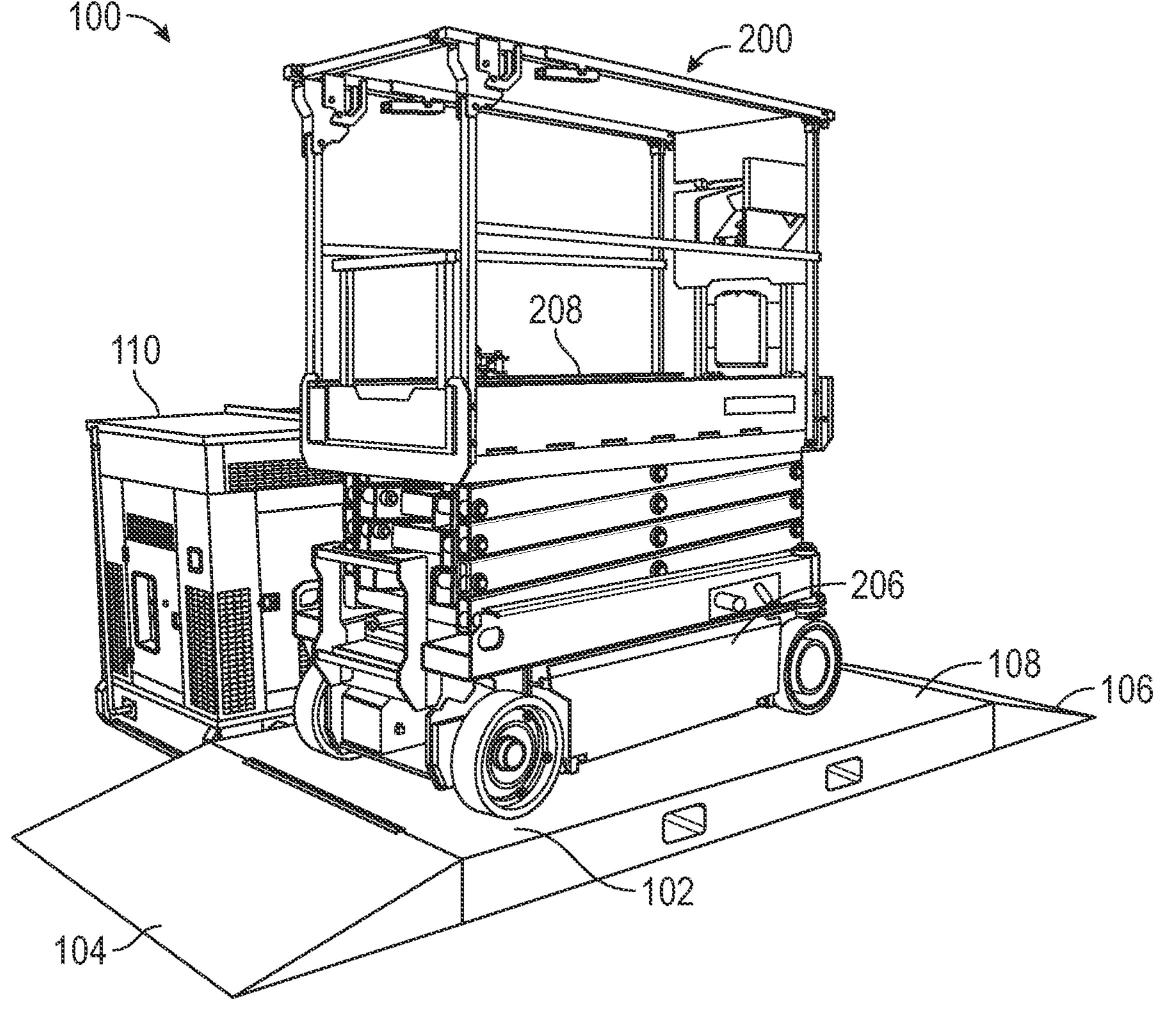
FIG. 2 is a perspective view of the platform charging unit of FIG. 1, shown interacting with a lift.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the figures generally, the various exemplary embodiments disclosed herein relate to systems, apparatuses, and methods for charging a lift device, such as an AWP or MEWP. The system for charging a lift generally includes a platform structure. The platform structure has a generally box-like shape, and includes two ramps positioned on either side of the platform structure to enable travel onto and off of the platform. The platform structure includes an induction coil (e.g., a copper coil, etc.) that is configured to receive current from an electrical power source, such as a utility source (e.g., from a wall socket, etc.), generator, or battery assembly. When the induction coil is powered, current is supplied from the electrical power source to the induction coil, which creates an magnetic field. The magnetic field extends upwardly and outwardly from the platform, such that a lift or other equipment positioned on the platform can interact with the generated magnetic field. If the lift or other equipment includes an antenna coil (e.g., a copper coil) in communication with its battery or battery assembly, a current will be generated within the antenna coil when the antenna coil is positioned within the magnetic field generated by the induction coil. In this mode, the induction coil is acting as the primary coil and the antenna coil is acting as the secondary coil in a inductive charging arrangement. The induction coil and the antenna coil can be of the same or similar design or may be of different designs (e.g., a different number of turns, wire gauge, size, etc.). One of the induction coil or the antenna coil may include fewer or more turns of copper than the other, or be made of a different material (brass, silver, or other conducting materials, etc.). The current within the antenna coil can then be supplied to the battery or battery assembly within the lift or other equipment to charge the battery or battery assembly without the need for a wired connection. After a sufficient charge level is achieved, the lift or other equipment can drive away from or otherwise be removed from the platform.

Additionally, the induction coils and antenna coils are configured for bi-directional charging, such that the antenna coil can receive current and generate a magnetic field which in turn induces a current in the induction coils. In this mode, the antenna coil acts as the primary coil and the induction coil acts as the secondary coil. Bi-directional charging can allow for the transfer of energy from unwanted equipment into higher usage equipment at a jobsite. Lifts or other equipment incorporating an antenna coil can also use the antenna coil in the same manner to pass electrical energy from onboard batteries of one lift device to other devices, including the charging system, for storage and subsequent use. The antenna coils can be coupled to the necessary electrical components (e.g., inverters, rectifiers, transformers) to facilitate both generating a magnetic field to charge another device and transforming a magnet field into electrical current to be used by the device housing the antenna coil (i.e., to act as both a primary coil and a secondary coil). In some examples, the lift devices are equipped with a plurality of antenna coils so that various different orientations can be used to wirelessly transmit energy between components.

As shown in FIG. 1, a charging system 100 is depicted. The charging system 100 generally includes a platform structure 102. The platform structure 102 has a generally rectangular shape box-like shape and is configured to support one or more lifts 200, as discussed in additional detail below. Two ramps 104, 106 are positioned either side of the platform structure 102 to direct a vehicle onto and off of the upper surface 108 of the platform structure 102. In some examples, the ramps 104, 106 are pivotally or removably coupled to the platform structure 102 so that the platform structure 102 can transition to a more compact shape for travel.

The charging system 100 further includes an electrical cabinet 110. The electrical cabinet 110 can support a variety of different electrical components, including transformers that are configured to step down and/or step up voltage received from a secondary source. In some examples, the electrical cabinet 110 also receives one or more inverters. The inverters are configured to transition direct current electricity stored within a battery or battery assembly 112 into alternating current electricity for use by the platform structure 102 when the charging system 100 is used in a primary mode to charge another device, as discussed below. For bi-directional charging, converters may also be included for converting alternating current received from the platform structure 102 into direct current for the battery assembly 112 when the charging system 100 is used in a secondary mode to be charged from another device, as discussed below.

The electrical cabinet 110 stores or is coupled to an electrical power source. For example, in some embodiments, the electrical cabinet is placed in communication with a utility source. The utility source can supply standard utility alternating current electrical power at 120 V and 60 Hz, for example. In other embodiments, the electrical cabinet 110 is placed in communication with a 240 V or 480 V power source instead. Additionally or alternatively, the electrical cabinet 110 can support one or more batteries 112. In some examples, a plurality of rechargeable batteries 112 (e.g., lithium-ion, nickel-cadmium, lead-acid, etc.) are received within the electrical cabinet 110. The batteries 112 are configured to receive electricity from the utility source through the inverter, which converts the AC utility source power into DC power which can be stored within the battery. In some examples, the batteries 112 can also be charged from other equipment on the platform structure 102, for example when the charging system 100 is used in a secondary mode. In other examples, the batteries 112 are removably coupled to the electrical cabinet 110 and can be removed and replaced. In still other embodiments, the electrical cabinet 110 houses an internal combustion engine and a generator that are configured to produce and supply power as a secondary power source.

Figure 5:
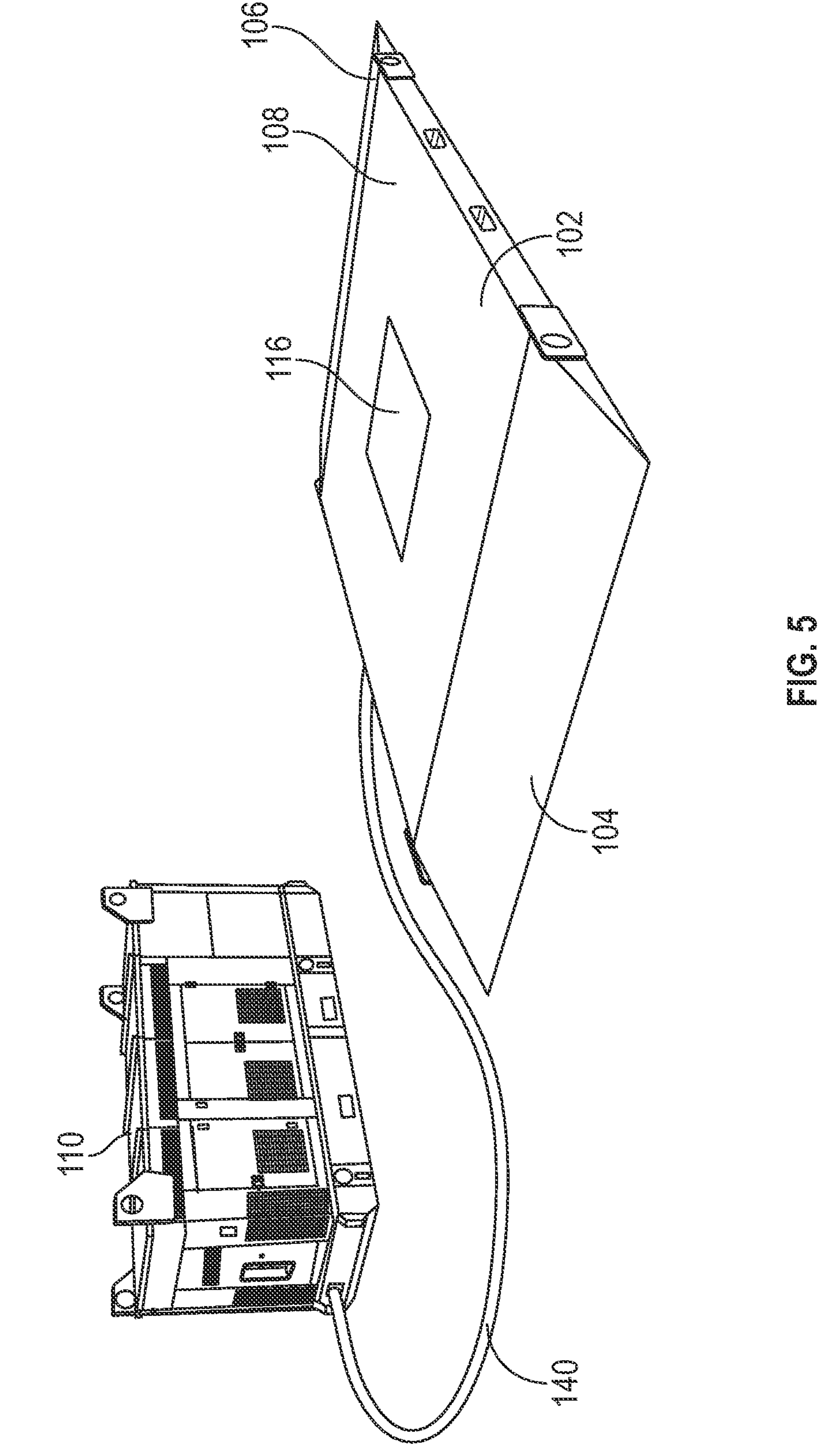
FIG. 5 is a perspective view of the platform charging unit of FIG. 1, shown with a platform structure positioned away from an electrical cabinet.
Figure 6:
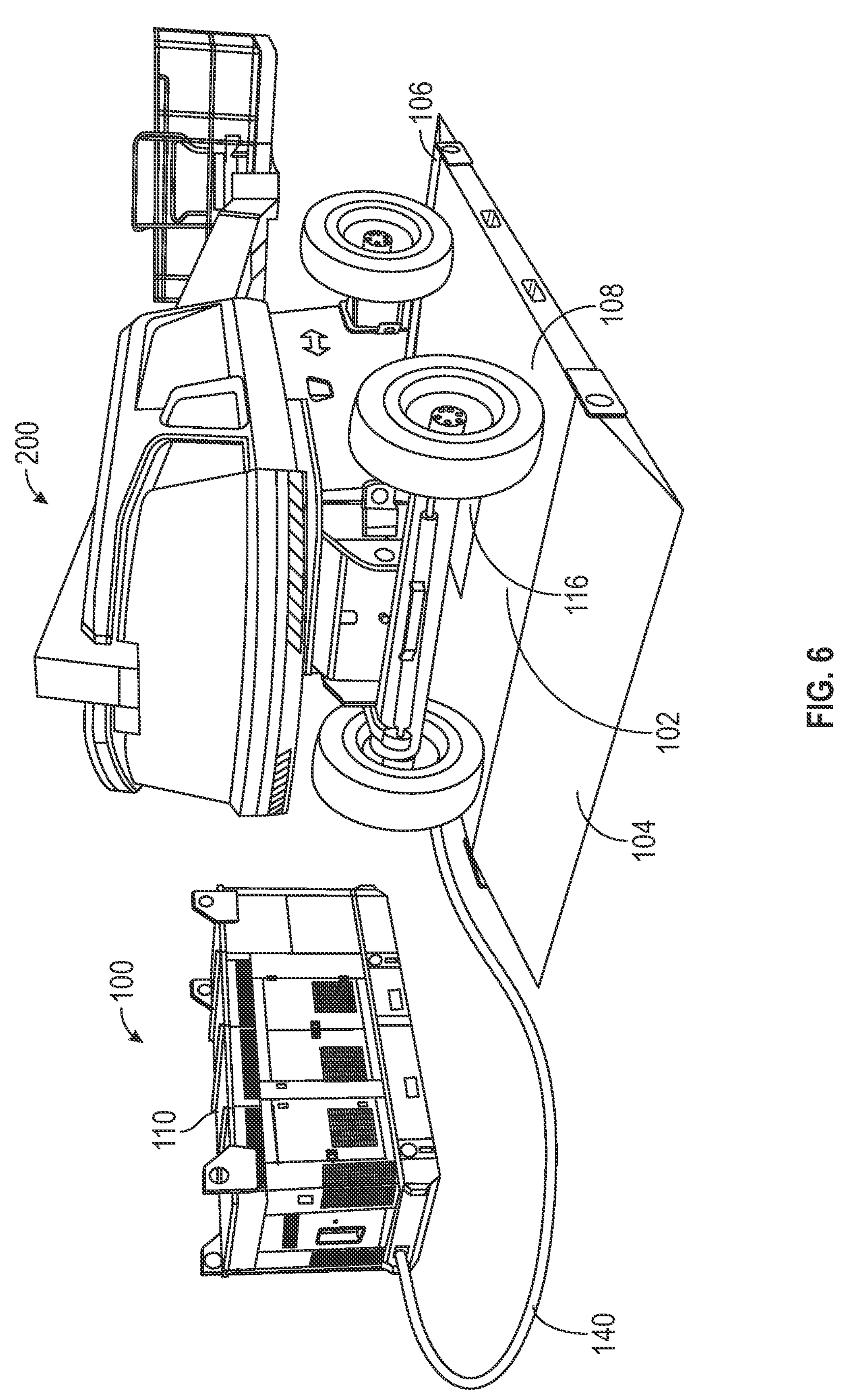
FIG. 6 is a perspective view of the platform charging unit of FIG. 5, shown interacting with another lift.

As depicted in FIGS. 5-6, the electrical cabinet 110 is electrically coupled to the platform structure 102 and is configured to supply electrical current to the platform structure 102 in a primary mode. In some embodiments, the electrical cabinet is electrically coupled to and supports more than one platform structure 102. Electrical current is provided from the electrical cabinet 110 to the platform structure 102 by one or more of the power sources in communication with the electrical cabinet 110. In some examples, a wired connection of one or more cables 140 and/or a plug is formed between the electrical cabinet 110 and the platform structure 102 so that electrical current can be efficiently transmitted between the electrical cabinet 110 and the platform structure 102. The electrical power transmitted from the electrical cabinet 110 can be preconditioned depending on the electrical supply source. For example, electrical power supplied to the platform structure 102 by the utility source can be passed through a transformer before being supplied to the platform structure 102. Alternatively, electrical power provided from the batteries 112 can be passed to an inverter before being supplied to the platform structure 102, such that alternating current is always provided to the platform structure 102.

Electrical current received by the platform structure 102 is then routed to an induction coil 114 received within the platform structure 102. The induction coil 114 can be formed of copper, for example, and includes one or more turns to form a wire structure. When current is provided to the induction coil 114, the current travels around the wire structure in a circular manner. Movement of the current through the induction coil 114 creates an magnetic field that extends substantially vertically upward, through the upper surface 108 of the platform structure 102 and above the platform structure 102, generally. The magnetic field generated by the induction coil 114 can then be used to generate and wirelessly charge lifts and other equipment positioned within the magnetic field, as explained in additional detail below.

The induction coil 114 is positioned within a charging area 116 formed within the platform structure 102. As depicted in FIG. 1, the charging area 116 can be visually marked on the platform structure 102 (e.g., with different coloration, etc.) so that an operator of a lift device or other vehicle can easily identify the location in which the induction coil 114 is positioned. In some examples, the charging area 116 is centrally located within the platform structure 102. In other examples, the charging area 116 is offset to one side of the platform structure 102. In still other examples, multiple charging areas 116 each with their own induction coils 114 are provided on a single platform structure 102, such that multiple lifts or other equipment can be charged simultaneously.

With additional reference now to FIGS. 2-6, a process for wirelessly charging a lift device 200 using the charging system 100 is depicted. To begin the wireless charging process for the lift device 200, the lift device 200 first drives onto the platform structure 102 using one of the ramps 104, 106. Although shown as a scissor lift, the lift device 200 can be one of a variety of different lift devices, including a boom lift, telehandler, electric scissor lift, forklift, or other suitable devices that include one or more battery-operated or electrical components.

Figure 4:
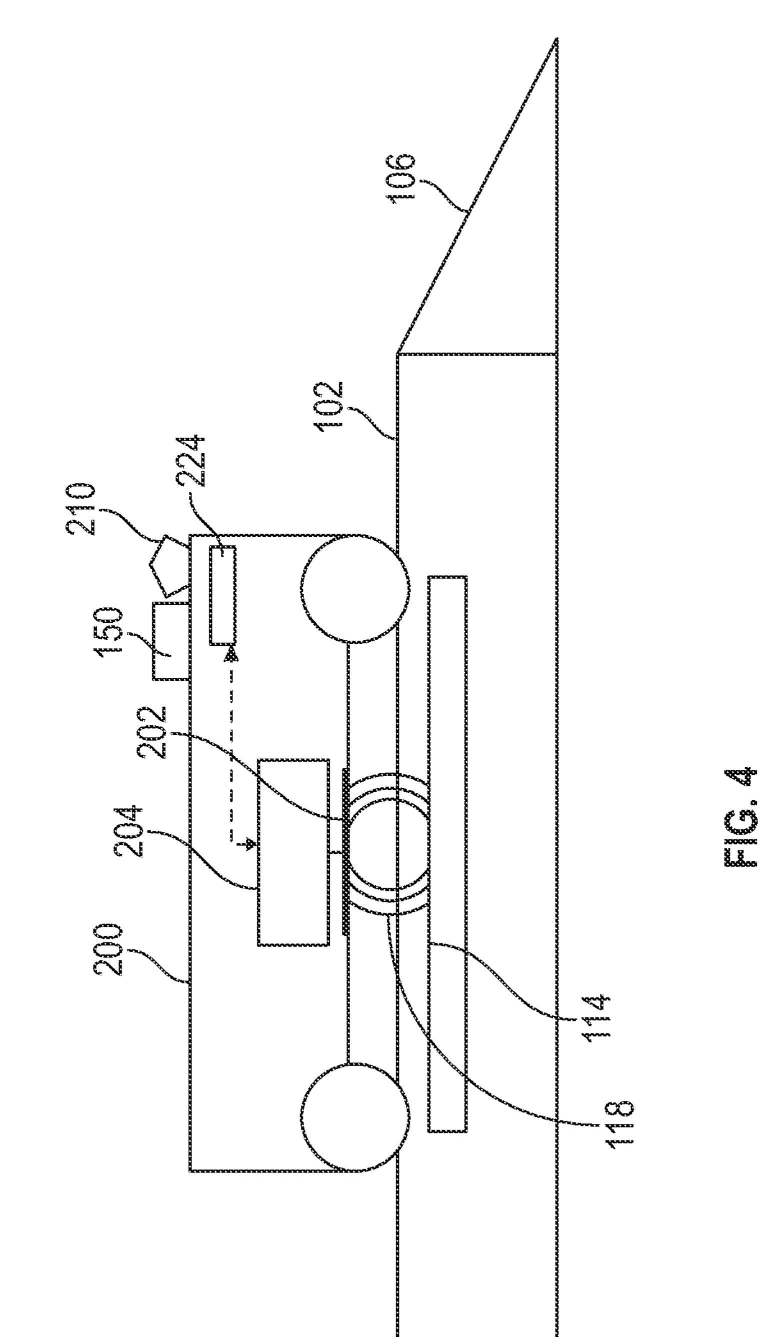
FIG. 4 is a schematic view of the lift of FIG. 2 positioned on the platform charging unit of FIG. 1.

To interact with the charging system 100 and as depicted in FIG. 4, the lift device 200 includes an coil for interacting with the magnetic field generated by the induction coil 114, shown as antenna coil 202. Antenna coil 202 is electrically coupled with a battery 204 of the lift device 200. The antenna coil 202, like the induction coil 114, is formed of copper wire that includes a series of turns. When the antenna coil 202 is positioned within an magnetic field, a current is generated within the antenna coil 202 that can then be ultimately provided to the battery 204 to help charge the battery 204. Accordingly, to better position the antenna coil 202 within magnetic fields (e.g., such as the magnetic field created by the induction coil 114), the antenna coil 202 is positioned at or near a base of a chassis 206 of the lift device 200. Accordingly, the antenna coil 202 will be positioned at or near an absolute bottom of the chassis 206 of the lift device 200.

The lift device 200 drives forward onto the platform structure 102 until the lift device 200 is positioned directly or approximately directly above the induction coil 114 and the charging area 116, more generally. Although shown centered above the charging area 116 and the induction coil 114 in FIG. 4, certain versions of the lift device 200 may have an antenna coil 202 offset from a center (i.e., to a different side) of the lift device 200. For example, in some embodiments, the antenna coil 202 is offset to one of the corners of the chassis 206. Such a configuration may help an operator within a platform 208 of the lift device 200 to direct the lift device 200 into the necessary charging area 116, given the more visible nature of the charging area relative to an edge of the vehicle. In other examples, the lift device 200 includes an indicator 210 (e.g., a light) on the chassis 206 or platform 208 that illuminates when the antenna coil 202 is positioned within the charging area 116 such that the battery 204 is receiving power (i.e., the battery is charging).

With the lift device 200 positioned so that the antenna coil 202 is above the induction coil 114 and the charging area 116, the antenna coil 202 is positioned within a magnetic field 118 created by the current passing through the induction coil 114. The magnetic field 118 induces a current within the antenna coil 202, which is then passed upwardly, to the battery 204 of the lift device to charge the battery 204. In some examples, the indicator 210 can provide a visual indication that charging is complete, or that charging has reached a threshold level.

Figure 3:
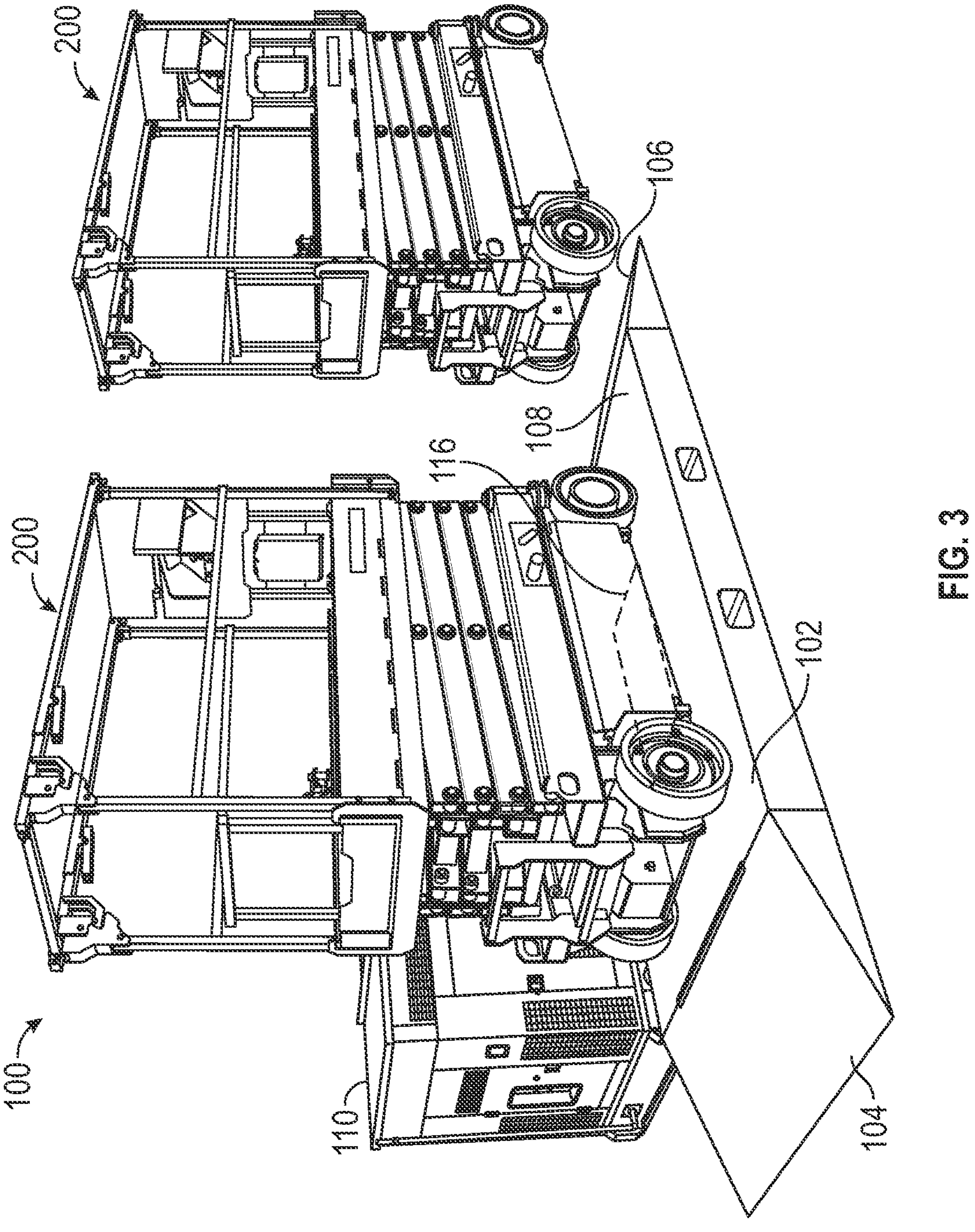
FIG. 3 is a perspective view of the platform charging unit of FIG. 1, shown interacting with a second lift after the lift of FIG. 2 has moved off the platform charging unit.

When a desired charge level has been reached, an operator (or a controller within the lift device 200, if the lift is autonomous or semi-autonomous) can drive or otherwise move the lift device 200 off of the platform structure 102. The lift device 200 can drive in either direction, down one of the ramps 104, 106, until the lift device 200 has been entirely moved from the charging system 100. Accordingly, and as depicted in FIG. 3, a second lift device 200 can be moved onto the platform structure 102 to complete a similar charging process.

Figure 7:
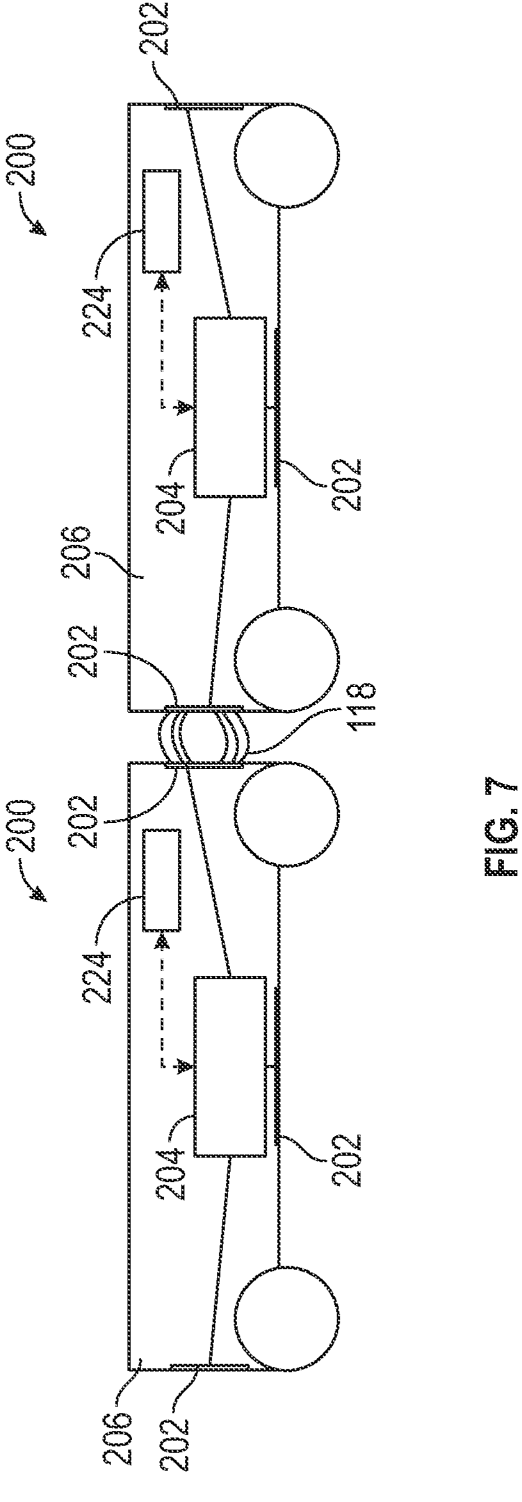
FIG. 7 is a schematic view of the lift of FIG. 2, positioned near another lift to wirelessly transmit energy to the other lift.
Figure 8:
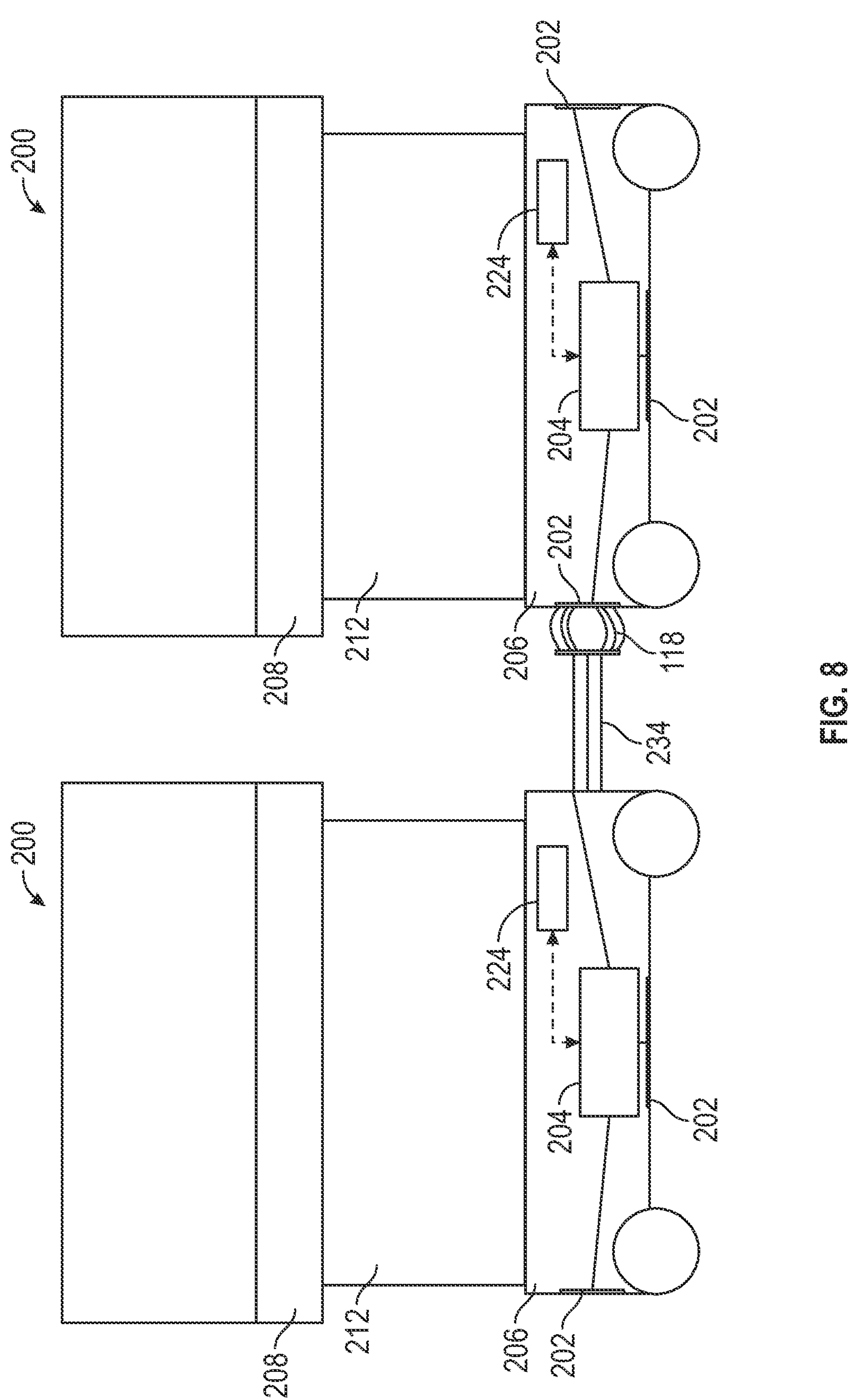
FIG. 8 is a schematic view of the lift of FIG. 2, shown with a deployable charging unit extended outward to wirelessly charge another lift.

Referring now to FIGS. 4 and 7-8, each of the lift devices 200 and the charging system 100 can be configured to execute bi-directional charging. Bi-directional charging can be particularly advantageous in a workplace, as certain equipment may be needed more than others, and the ability to transfer energy from equipment that is no longer needed at a jobsite to equipment that is still needed for additional tasks can prove to be helpful. In some examples, the bi-directional charging used to charge the charging system 100 from by the lift device 200. Additionally or alternatively, the bi-directional charging can be used to charge one lift device 200 from another lift device 200.

In some examples, the lift device 200 and the charging system 100 are configured to operate in a primary mode to charge another device and in a secondary mode to be charged from another device. For example referring to a lift device 200, in the primary mode the lift device 200 is configured to transmit energy from the battery 204 to the induction coil 114. In some embodiments, the controller 224 of the lift device 200 receives a command to charge another device. For example, if the controller 224 receives a command such as instructions that a piece of equipment (i.e., a lift device 200, or other vehicle) is no longer needed at a jobsite that day, the controller 224 can maneuver the lift device 200 onto the platform structure 102 to initiate primary mode for wireless energy transfer. With the lift device 200 positioned above the charging area 116, the controller 224 can communicate with the battery 204 to start passing a current through the antenna coil 202. As current is sent by the battery 204 to the antenna coil 202, an magnetic field 118 is once again generated. While the controller directing the charging operation is shown as controller 224 of the lift device 200, in some embodiments, the controller 224 is located in the charging system 100. The command can be calculated based on the charge levels of the charging system 100 and/or one or more of the lift devices 200. For example, a command can be generated when a first lift device 200 contains more energy than necessary while the charging system 100 contains less energy than needed to charge a different lift device 200. The command can also be based on a time (i.e., scheduled, etc.), for example at the end of a work day, one or more lift devices 200 can discharge to the charging system 100. The command can also be based on the discovery of an uncharged or under-charged device. In some embodiments, the command is an indication to switch from a primary mode to a secondary mode based on a level of current in the induction coil 114. For example, the lift device 200 may be positioned on the platform structure 102 and generate a magnetic field with the antenna coil 202 which induces a current in the induction coil 114. The charging system 100 may detect the presence of the induced current in the induction coil 114 and thereby transition to the secondary mode to pass the induced current from the induction coil 114 to the batteries 112.

If the magnetic field 118 is generated above or substantially above the induction coil 114, a current will be induced within the induction coil 114. The induced current can then be transmitted, through the cable 140, to the electrical cabinet 110 and the battery assembly 112. In some examples, the current is first passed through the electrical cabinet 110 and conditioned for the battery assembly 112 before being transferred to the battery assembly 112. In other examples, the battery assembly 112 is capable of directly receiving the induced current. Accordingly, the battery assembly 112 can store energy received wirelessly from the battery 204 for subsequent use and supply to the platform structure 102 to charge a different lift device 200 or vehicle. The lift device 200 can thereby offload energy, via the wireless process in the primary mode, until the battery 204 reaches a threshold value (e.g., 20% remaining, 10% remaining, etc.) such that the lift device 200 can remain operational, but excess energy has been transported to the battery 112. Still in other embodiments, the lift device 200 can charge the battery assembly 112 until a threshold level of charge in the battery assembly 112 is reached. For example, a lift device 200 may require a certain amount of charge, and a second lift device 200 can provide that specific amount to the battery assembly 112 via the wireless charging process for the first lift device 200.

In addition to being able to transmit energy from the battery 204 of the lift device 200 to the battery assembly 112, the lift device 200 can also transmit energy from the battery 204 directly to other lift devices 200. For example, each lift device 200 can include multiple antenna coils 202. As depicted in FIG. 7, antenna coils 202 can be positioned at the bottom, front, rear, and/or sides of the chassis 206. Still in other embodiments, each lift device 200 can include a moveable antenna coil 202, the position of which can be adjusted based on what type of wireless charging process is to occur (i.e., lift device 200 to platform structure 102, lift device 200 to lift device 200, etc.). The antenna coils 202 can be used to charge the lift device 200 in a secondary mode, wherein a current is induced in the antenna coils 202 from a magnetic field generated by another device (i.e., the induction coils 114). The antenna coils 202 can also be used generate a magnetic field to charge another device in a primary mode of the lift device 200.

To perform a wireless charging process lift device-to-lift device, as depicted in FIGS. 7-8, the controller 224 and/or an operator first directs one lift device 200 into position relative to another lift device 200. The controller 224 can communicate with nearby equipment (e.g., over Bluetooth, Wi-Fi, or other wireless communication protocols) to locate nearby lift devices 200 or other equipment nearby. Similar to the charging process described above with respect to the charging system 100, the lift device 200 can be first directed to a position within range of another lift device 200 to be charged or to be used as a charging device. When the lift device 200 arrives with its antenna coil 202 within a designated proximity to the antenna coil 202 of another lift device 200 (e.g., 1 foot, 6 inches, etc.) the controller 224 can direct the battery 204 to begin providing current to the antenna coil 202 positioned proximate the other lift device 200. The current from the battery 204 passing through the antenna coil 202 generates a magnetic field 118. The adjacent lift device 200, which has an antenna coil 202 positioned within the magnetic field 118, experiences an induced current as a result of being positioned within the magnetic field 118. The current induced within the antenna coil 202 of the second lift device 200 can then be provided to the battery 204 of the second lift device 200. The antenna coils 202 that are not positioned adjacent the other lift device 200 are not provided with current from the battery 204, and do not produce an magnetic field.

As discussed above, the wireless charging process can be bi-directional. Accordingly, the lift device 200 can also draw current from the battery 204 of another lift device 200, in addition to being able to transmit current to charge the battery 204 of another lift device 200. The controllers 224 of each lift device 200 can communicate with one another to coordinate positioning and duration of the charging process, in order to transfer a desired amount of energy between batteries 204. Once the desired amount of energy is transferred between lift devices 200, the lift devices 200 can drive or be driven away from one another.

In some examples, the antenna coil 202 of a lift device 200 is moveable relative to the lift device 200. As depicted in FIG. 8, the lift device 200 includes an extendable and retractable arm 234 that is configured to move an antenna coil 202 outwardly, away from the chassis 206. This configuration can be particularly advantageous in situations where an operator is steering the lift device 200 from atop the platform 208 of the lift device 200, above the lifting mechanism 212 (e.g., a scissor structure or boom), where visibility of the chassis of each lift device 200 may be hindered. When a charging or energy transfer process is being initiated, the operator (or controller 224) can first extend the arm 234 outward. In some examples, a controller upon the platform 208 can be actuated to extend the arm 234. With the arm 234 extended, an operator atop the platform 208 can more easily see the target charging area on the lift device 200, which can allow the operator to better position the lift device 200 relative to another lift device 200.

Although depicted as an induction coil 114, various other types of wireless charging mechanisms can be used. For example, magnetic resonance charging, electric field coupling, or radio receptioning can be used in lieu of electromagnetic induction. While operationally different, the structure for each different type of wireless charging mechanism described above can be considered encompassed within the term "induction coil."

Using the above described charging systems and methods, a jobsite can incorporate a wireless charging unit that can help to continuously charge lift devices and other equipment. The wireless platform can create a faster and more efficient way to charge devices remotely, which helps to ensure that devices at a jobsite are operable beyond the life of a single charge of a battery. While conventional equipment is typically only able to operate for as long as a single charge of a battery lasts, the charging system disclosed herein permits for extended use of equipment.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided (e.g., +/−10%). Accordingly, these terms should be interpreted as indicating that insubstantial or inconsequential modifications or alterations of the subject matter described and claimed are considered to be within the scope of the invention as recited in the appended claims.

It should be noted that the term “exemplary” as used herein to describe various embodiments is intended to indicate that such embodiments are possible examples, representations, and/or illustrations of possible embodiments (and such term is not intended to connote that such embodiments are necessarily extraordinary or superlative examples).

The terms “coupled,” “connected,” and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., “top,” “bottom,” “above,” “below,” “between,” etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the wireless charging system as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A lift comprising:
- a chassis;
- a battery pack coupled to the chassis; and
- a first antenna coil electrically coupled to the battery pack and positioned at a distal end of an arm that is movable relative to the chassis, the first antenna coil configured to generate current from a first magnetic field and transmit current to the battery pack to charge the battery pack,
- wherein the first antenna coil is further configured to generate a second magnetic field using current from the battery pack to transmit energy from the battery pack outwardly, away from the chassis.

2. The lift of claim 1, wherein the first magnetic field is generated by an induction coil within an external device.

3. The lift of claim 2, wherein the external device is at least one of a platform of a charging system or a second lift device.

4. The lift of claim 1, wherein at a given time the first antenna coil is configured to generate one of the current from the first magnetic field or the second magnetic field.

5. The lift of claim 1, wherein the first antenna coil is configured to generate current from the first magnetic field to charge the battery pack in a secondary mode and wherein the first antenna coil is configured to generate the second magnetic field using current from the battery pack in a primary mode.

6. The lift of claim 5, further comprising a controller coupled to the first antenna coil and the battery pack, the controller configured to configure the first antenna coil in one of the primary mode or the secondary mode based on a command.

7. The lift of claim 6, wherein the command is based on at least one of a charge level of the battery pack, a presence of an induced current in an induction coil within an external device, or a charge level of a second battery received within the lift.

8. The lift of claim 1, further comprising at least one or more auxiliary antenna coils in communication with the battery pack.

9. The lift of claim 8, wherein the chassis comprises a bottom, a front, a rear, a left side, and a right side, wherein the first antenna coil is positioned proximate a bottom surface of the chassis, and wherein at least one of the at least one or more auxiliary antenna coils are positioned proximate at least one of the front, rear, left side, or right side of the chassis.

10. A method for charging a lift device, the method comprising:
- providing a first lift device comprising a first chassis, a first battery pack coupled to the first chassis, and a first antenna coil electrically coupled to the first battery pack;
- providing a second lift device comprising a second chassis, a second battery pack coupled to the second chassis, and a second antenna coil electrically coupled to the second battery pack;
- generating, by the first antenna coil, a first magnetic field using supplied current from the first battery pack to transmit energy from the first battery pack outwardly, away from the first chassis;
- generating, by the second antenna coil, current from the first magnetic field; and
- transmitting, from the second antenna coil, the current to the second battery pack to charge the second battery pack.

11. The method of claim 10, further comprising;
- providing a controller coupled to the first lift device, the controller configured to control the first lift device between a primary mode and a secondary mode, wherein in the primary mode the first antenna coil generates a first magnetic field and in the secondary mode the first antenna coil generates current from a second magnetic field;
- positioning, the first lift device proximate the second lift device such that the second antenna coil is substantially aligned with the first antenna coil; and
- generating, by the first antenna coil, the first magnetic field in response to a command received by the controller indicating the second lift device has a priority higher than the first lift device.

* * * * *